(12) United States Patent
Takada et al.

(10) Patent No.: US 7,149,184 B2
(45) Date of Patent: Dec. 12, 2006

(54) TRANSMISSION RATE MONITORING APPARATUS AND METHOD

(75) Inventors: Syuji Takada, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 09/858,611

(22) Filed: May 16, 2001

(65) Prior Publication Data

US 2002/0101919 A1    Aug. 1, 2002

(30) Foreign Application Priority Data

Jan. 26, 2001  (JP)  ............................... 2001-018649

(51) Int. Cl.
*H04J 1/16*  (2006.01)
*H04J 3/14*  (2006.01)

(52) U.S. Cl. .................. 370/230; 370/232; 370/235
(58) Field of Classification Search ........ 370/229–236, 370/252, 253
See application file for complete search history.

(56) References Cited

U.S. PATENT DOCUMENTS

| | | | |
|---|---|---|---|
| 4,769,811 A * | 9/1988 | Eckberg et al. ............. | 370/236 |
| 5,289,462 A * | 2/1994 | Ahmadi et al. ............. | 370/232 |
| 5,311,513 A * | 5/1994 | Ahmadi et al. ............. | 370/230 |
| 5,317,563 A * | 5/1994 | Oouchi et al. .............. | 370/232 |
| 5,570,360 A * | 10/1996 | Klausmeier et al. ........ | 370/232 |
| 5,694,390 A * | 12/1997 | Yamato et al. ............. | 370/230 |
| 5,745,490 A * | 4/1998 | Ghufran et al. ............ | 370/397 |
| 5,796,956 A * | 8/1998 | Jones ......................... | 709/233 |
| 6,167,050 A * | 12/2000 | Chung ..................... | 370/235.1 |
| 6,347,077 B1 * | 2/2002 | Ginzboorg .................. | 370/230 |
| 6,349,088 B1 * | 2/2002 | Ginzboorg et al. ......... | 370/230 |
| 6,563,792 B1 * | 5/2003 | Chang et al. ............. | 370/235.1 |
| 6,785,232 B1 * | 8/2004 | Kotser et al. ............. | 370/230.1 |
| 6,798,741 B1 * | 9/2004 | Lodha et al. ............... | 370/229 |

FOREIGN PATENT DOCUMENTS

| | | |
|---|---|---|
| JP | 58171842 | 10/1983 |
| JP | 06037792 | 2/1994 |

* cited by examiner

*Primary Examiner*—Ajit Patel
(74) *Attorney, Agent, or Firm*—Katten Muchin Rosenman LLP

(57) ABSTRACT

A transmission rate monitoring apparatus capable of promptly detecting the average transmission rate of data transmitted on a transmission channel. Data is received on the transmission channel, and a desired average transmission rate is set with respect to a predetermined time period. The amount of data received is measured and data is accepted or discarded in accordance with the data amount measured within the predetermined time period and the average transmission rate.

9 Claims, 14 Drawing Sheets

TRANSMISSION RATE MONITORING APPARATUS AND METHOD

BACKGROUND OF THE INVENTION (1) Field of the Invention

The present invention relates to transmission rate monitoring apparatus and method, and more particularly, to transmission rate monitoring apparatus and method for monitoring the transmission rate of a transmission channel.

(2) Description of the Related Art

With the popularization of the Internet, communications using variable-length data such as IP (Internet Protocol) packets have become more and more prevalent.

As a conventional form of providing Internet service, best-effort delivery type was popular wherein no guarantee is given with respect to delay of data, transmission rate and the like. With the recent advent of new services such as VoIP (Voice over IP), VPN (Virtual Private Network), etc., however, there has been a demand for guaranteeing QoS (Quality of Service) on an END-to-END basis.

Transmission rate (transmission band) is one such QoS. The transmission rate indicates an amount of data that each user can transmit within a predetermined time. If no guarantee is given for the transmission rate, certain user's communication at a rate exceeding the declared transmission rate overrides other users' transmission rates, causing lowering of the communication quality, network congestion, etc.

In order to guarantee the transmission rate, it is necessary that the transmission rate (band in use) currently used by each user should be monitored. There have conventionally been known a token bucket procedure and a leaky bucket procedure as principal methods for monitoring the transmission rate.

FIG. 11 illustrates a transmission rate monitoring method according to the token bucket procedure.

According to the token bucket procedure, a bucket 1 with a bucket size B is presumed into which tokens (water) flow at a fixed rate. If the packet size L of a received packet 2 or 3 is greater than the amount of tokens contained in the bucket 1 (value of a token bucket counter TBC), the packet is discarded as being not acceptable. Thus, on the average, the transmission rate of data flowing through the network is controlled so as not to exceed a rate R of tokens poured into the bucket.

FIG. 12 illustrates the control according to the token bucket procedure. In the figure, the horizontal axis indicates time t and the vertical axis indicates the value of the token bucket counter TBC. The broken line parallel with the horizontal axis represents the bucket size B.

First, at time t1, a packet with a packet size L1 is received, whereupon the packet size L1 is compared with the value of the token bucket counter TBC. Since the value of the token bucket counter TBC is greater than the packet size, the packet is judged acceptable and sent out onto the network. At this time, a value corresponding to the packet size L1 is subtracted from the token bucket counter TBC. The value of the TBC increases thereafter at the token rate R.

Subsequently, at time t2, a packet with a packet size L2 is received, whereupon a determination is made in the same manner as stated above. This packet also is judged acceptable and sent out onto the network. A similar operation is repeated thereafter at time t3 and time t4.

A packet arriving at time t5 has a packet size L5 greater than the then-counted value of the token bucket counter TBC. Accordingly, the packet is judged unacceptable and is discarded.

The process described above makes it possible to control the transmission rate of specific packets flowing through the network.

FIG. 13 illustrates a transmission rate monitoring method according to the leaky bucket procedure.

In the leaky bucket procedure, a bucket 10 with a bucket size B is presumed from which tokens (water) flow out at a fixed rate. If the sum of the packet size L of a received packet 11 or 12 and the amount of tokens contained in the bucket 10 (value of a leaky bucket counter LBC) is greater than the bucket size B, the packet is judged unacceptable and discarded. If the former is not greater than the latter, the packet concerned is judged acceptable and sent out onto the network, and also a value corresponding to the packet size is added to the leaky bucket counter LBC. Thus, on the average, the transmission rate of data flowing through the network is controlled so as not to exceed a rate R of tokens flowing out of the bucket.

FIG. 14 illustrates the control according to the leaky bucket procedure. In the figure, the horizontal axis indicates time t and the vertical axis indicates the value of the leaky bucket counter LBC. The broken line parallel with the horizontal axis represents the bucket size B.

First, at time t1, a packet with a packet size L1 is received, whereupon the sum of the packet size L1 and the value of the leaky bucket counter LBC is compared with the bucket size B. Since the latter is greater than the former, the packet is judged acceptable and sent out onto the network. At this time, a value corresponding to the packet size L1 is added to the leaky bucket counter LBC. The value of the LBC decreases thereafter at the token rate R.

Subsequently, at time t2, a packet with a packet size L2 is received, whereupon a determination is made in the same manner as mentioned above. This packet also is judged acceptable and sent out onto the network. A similar operation is repeated thereafter at time t3 and time t4.

The sum of the packet size L5 of a packet arriving at time t5 and the then-counted value of the leaky bucket counter LBC is greater than the bucket size B. Accordingly, this packet is judged unacceptable and is discarded.

The process described above makes it possible to control the transmission rate of specific packets flowing through the network.

In the case of carrying out either the token bucket procedure or the leaky bucket procedure, tokens that have flown into (or out of) the bucket need to be calculated using the time t1 of reception of the immediately preceding packet, the current time t2 and the token rate R, and generally the expression $(t2-t1) \times R$ is used for the calculation.

Since the expression involves multiplication, a problem arises in that the configuration of the apparatus is complicated and that a longer time is required for the calculation.

Also, the length of time that can be spent on the calculation is nearly proportional to the packet length. Consequently, if the packet length is short, only a short period of time can be spent on the calculation, and in the worst case the calculation cannot be completed within the required time.

SUMMARY OF THE INVENTION

The present invention was created in view of the above circumstances, and an object thereof is to provide transmission rate monitoring apparatus and method which permit the acceptability of a packet to be determined in a short period of time.

Another object of the present invention is to provide transmission rate monitoring apparatus and method which can reliably determine the acceptability of a packet even in the case where the packet length is short.

To achieve the above objects, there is provided a transmission rate monitoring apparatus for monitoring a transmission rate of a transmission channel. The transmission rate monitoring apparatus comprises data receiving means for receiving data, average transmission rate setting means for setting a desired average transmission rate with respect to a predetermined time period, data amount measuring means for measuring an amount of data received by the data receiving means, and data accepting/discarding means for accepting or discarding the data received within the predetermined time period in accordance with the average transmission rate.

Also, to achieve the above objects, there is provided a transmission rate monitoring method for monitoring a transmission rate of a transmission channel. The transmission rate monitoring method comprises a data receiving step of receiving data, an average transmission rate setting step of setting a desired average transmission rate with respect to a predetermined time period, a data amount measuring step of measuring an amount of data received in the data receiving step, and a data accepting/discarding step of accepting or discarding the data received in the data receiving step, in accordance with the data amount measured within the predetermined time period in the data amount measuring step and the average transmission rate.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
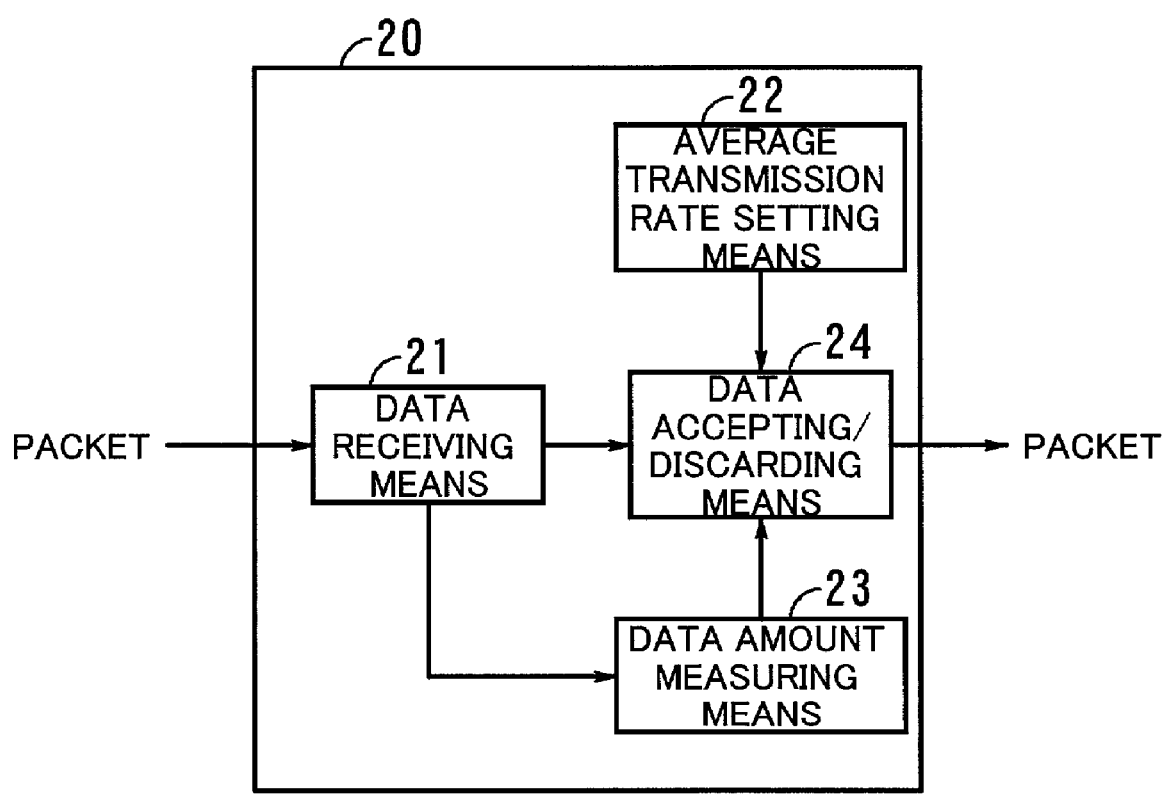
FIG. 1 is a diagram illustrating the principle of operation according to the present invention.

FIG. 1 illustrates the principle of operation according to the present invention. As shown in the figure, a transmission rate monitoring apparatus 20 according to the present invention comprises data receiving means 21, average transmission rate setting means 22, data amount measuring means 23, and data accepting/discarding means 24.

The data receiving means 21 receives predetermined data flowing through a network.

The average transmission rate setting means 22 sets a desired average transmission rate.

The data amount measuring means 23 measures an amount of data received by the data receiving means 21.

The data accepting/discarding means 24 accepts or discards the data received by the data receiving means 21, in accordance with the data amount measured within a predetermined time period by the data amount measuring means 23 and the average transmission rate.

Operation according to the illustrated principle will be now described.

The data receiving means 21 receives a predetermined packet to be monitored, which is flowing through a network, not shown, and supplies the received packet to the data accepting/discarding means 24 and the data amount measuring means 23.

The data amount measuring means 23 measures the data amount of the packet received by the data receiving means 21 and supplies the measurement result to the data accepting/discarding means 24.

The average transmission rate setting means 22 is set with an average transmission rate for a predetermined time period, and converts the average transmission rate into an amount (hereinafter transmittable data amount) of data transmittable within the predetermined time period. The conversion needs to be performed only once at the start of monitoring.

At the beginning of the predetermined time period, the data accepting/discarding means 24 acquires the transmittable data amount from the average transmission rate setting means 22 and stores the same. When a packet is received, the data accepting/discarding means acquires the data amount of the packet from the data amount measuring means 23 and subtracts the acquired data amount from the transmittable data amount stored beforehand. If a positive value is derived as a result of the subtraction, then it means that the average transmission rate will not be exceeded, and accordingly, the packet concerned is sent out onto the network.

If, on the other hand, a negative value is derived as a result of the subtraction, it means that the average transmission rate will be exceeded, and therefore, the packet concerned as well as packets received thereafter within the predetermined time period are discarded.

When the predetermined time period has expired, the data accepting/discarding means acquires a transmittable data amount from the average transmission rate setting means 22 in the same manner as described above, and again performs the data accepting/discarding process.

As described above, according to the present invention, a predetermined time period is set, an amount of data transmittable within the predetermined time period is set, and if it is judged that the transmittable data amount is about to be exceeded by the cumulative data amount of packets, the succeeding packets are discarded, whereby simple calculation has only to be performed to monitor the transmission rate.

An embodiment of the present invention will be now described.

Figure 2:
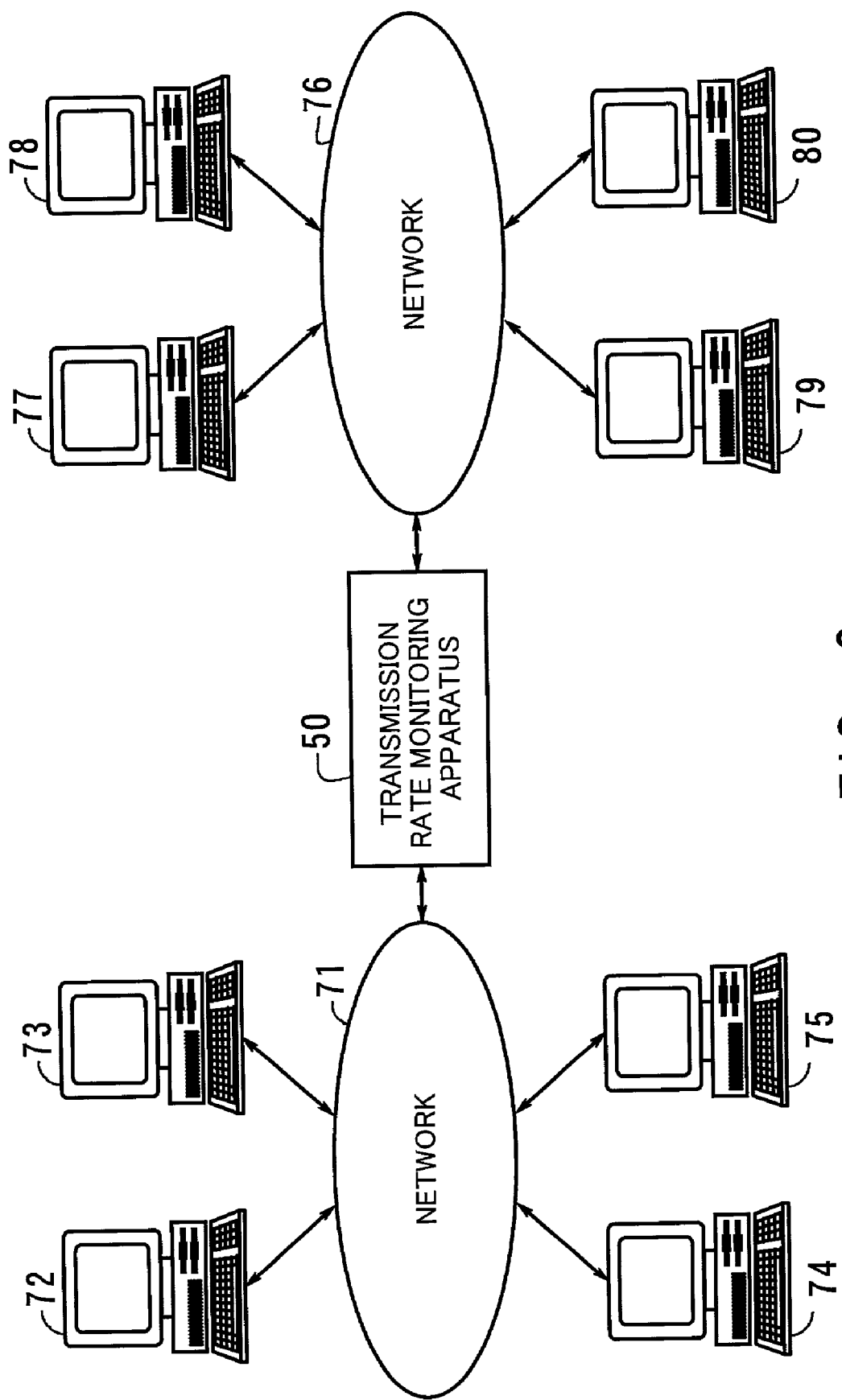
FIG. 2 is a diagram showing an exemplary configuration according to an embodiment of the present invention.

FIG. 2 shows an exemplary configuration according to the embodiment of the present invention. In the figure, a transmission rate monitoring apparatus 50 according to the present invention monitors packets transmitted between networks 71 and 76, and if a preset transmission rate is exceeded, the apparatus 50 performs a process for discarding packets. Namely, the transmission rate of each session of communication is controlled so as not to exceed a preset level, thereby preventing a certain session from overriding the transmission rates of other sessions.

The networks 71 and 76 comprise, for example, the Internet or LAN (Local Area Network) and transmit IP (Internet Protocol) packets to their destination addresses.

Computers 72 to 75 and 77 to 80 are servers or clients each constituted by a personal computer, for example, and transmit/receive data to/from other computers through the networks 71 and 76.

Figure 3:
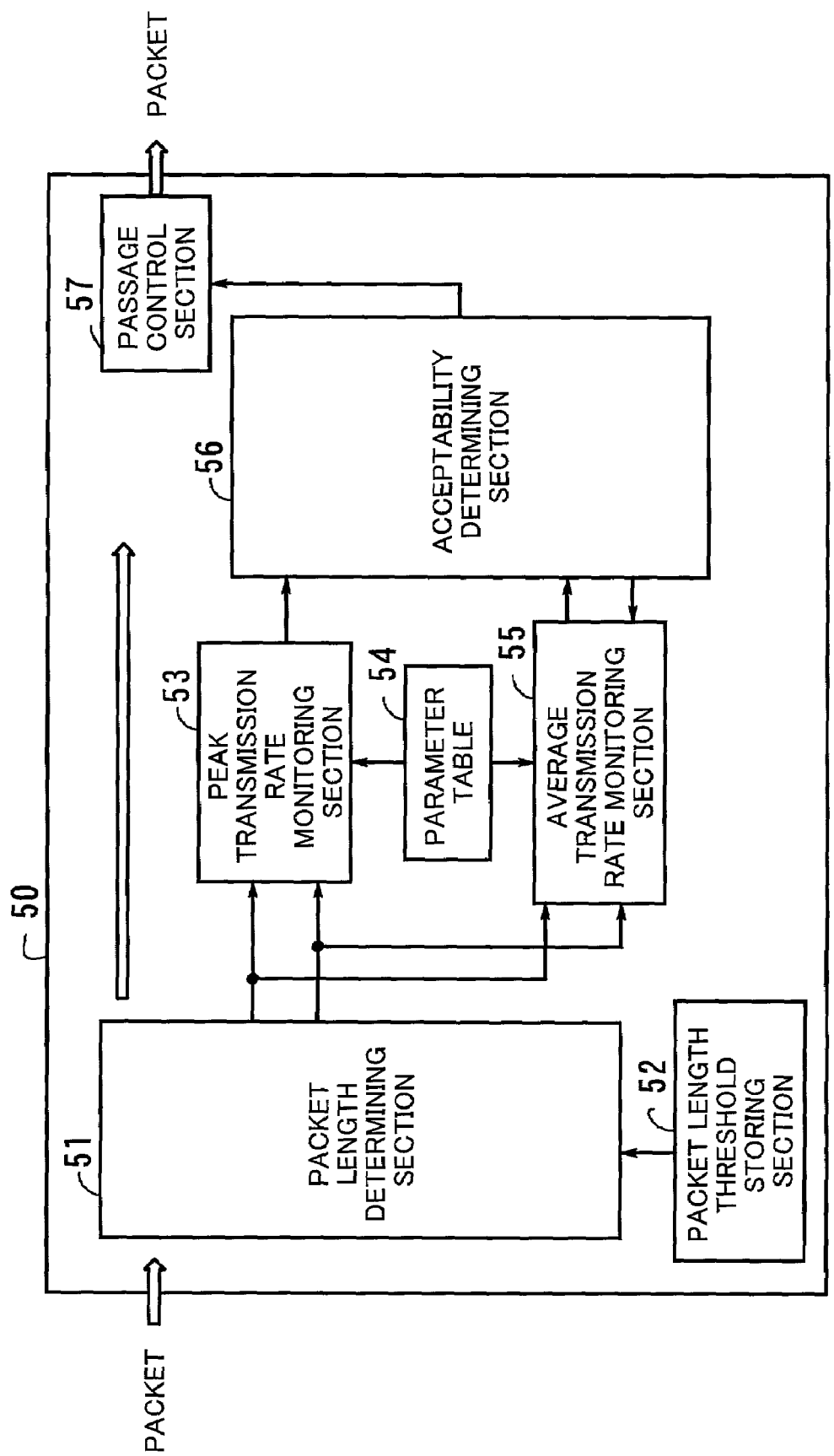
FIG. 3 is a block diagram showing in detail an exemplary configuration of a transmission rate monitoring apparatus appearing in FIG. 2.

FIG. 3 shows in detail an exemplary configuration of the transmission rate monitoring apparatus 50 appearing in FIG. 2. As shown in the figure, the transmission rate monitoring apparatus 50 comprises a packet length determining section 51, a packet length threshold storing section 52, a peak transmission rate monitoring section 53, a parameter table 54, an average transmission rate monitoring section 55, an acceptability determining section 56, and a passage control section 57.

The packet length determining section 51 measures the packet size of a packet received from the network 71, 76, and compares the received packet size with a threshold stored in the packet length threshold storing section 52. If the data amount of the received packet is greater than the threshold, the packet is judged to be a long packet; if not, the packet is judged to be a short packet. The result of judgment is supplied, together with the received packet size and a flag indicative of reception of the packet, to the peak transmission rate monitoring section 53 and the average transmission rate monitoring section 55.

The packet length threshold storing section 52 comprises a semiconductor memory, for example, and stores a threshold for making a strict determination as to whether the received packet is a long packet or a short packet.

The peak transmission rate monitoring section 53 measures a peak transmission rate of received packets according to the token bucket procedure or the leaky bucket procedure explained above with reference to FIGS. 11 and 13, and monitors the peak transmission rate to determine whether or not a predetermined value is exceeded by the peak transmission rate.

The average transmission rate monitoring section 55 measures an average transmission rate of all received packets by a method described later, and monitors the average transmission rate to determine whether or not a predetermined value is exceeded by the average transmission rate.

The parameter table 54 comprises a semiconductor memory, for example, and supplies necessary parameters to the peak transmission rate monitoring section 53 and the average transmission rate monitoring section 55.

The acceptability determining section 56 looks up the peak transmission rate and the average transmission rate obtained as a result of the monitoring by the peak transmission rate monitoring section 53 and the average transmission rate monitoring section 55. If the peak and average transmission rates are greater than their respective predetermined values, the acceptability determining section judges that the packet concerned is unacceptable, and notifies the passage control section 57 of unacceptability.

The passage control section 57 carries out control in accordance with the decision made by the acceptability determining section 56 such that the packet input from the packet length determining section 51 is allowed to pass or discarded.

Figure 4:
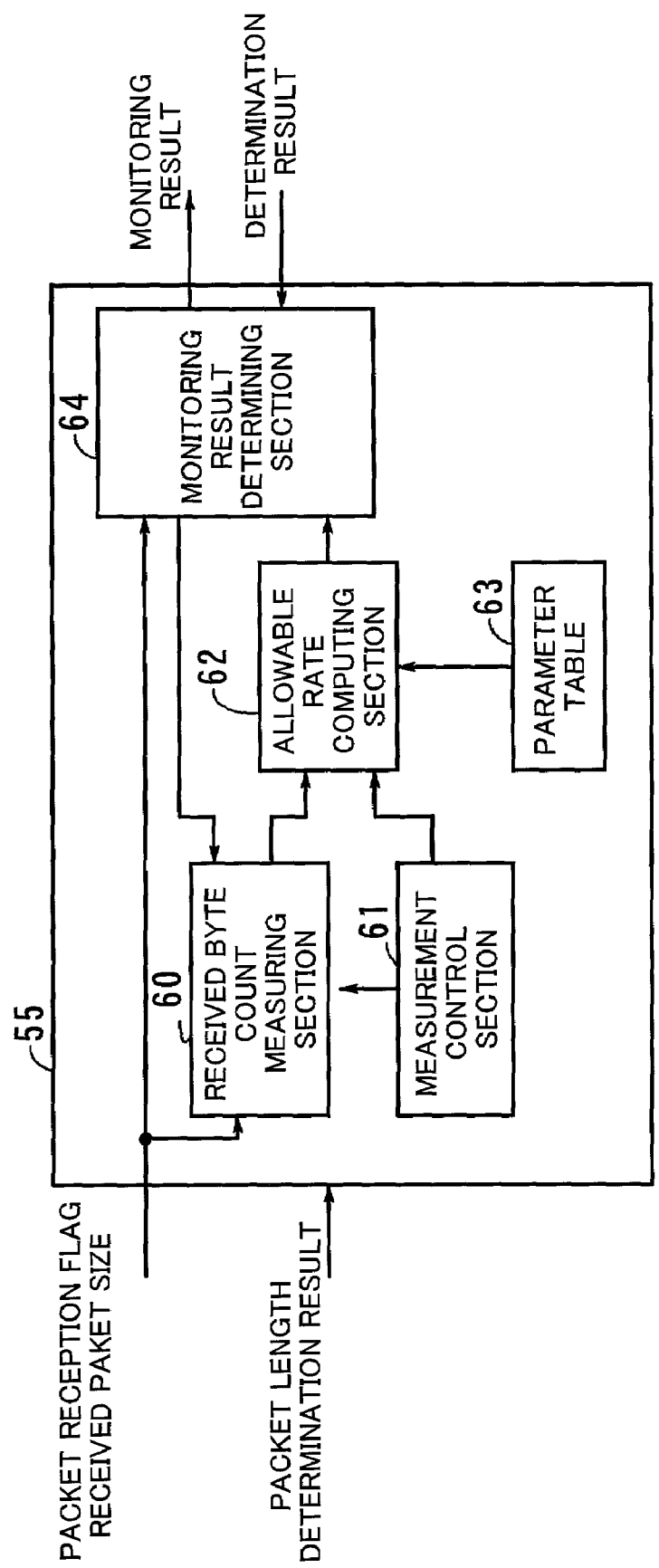
FIG. 4 is a block diagram showing in detail an exemplary configuration of an average transmission rate monitoring section appearing in FIG. 3.

FIG. 4 shows in detail an exemplary configuration of the average transmission rate monitoring section 55 appearing in FIG. 3. As shown in the figure, the average transmission rate monitoring section 55 comprises a received byte count measuring section 60, a measurement control section 61, an allowable rate computing section 62, a parameter table 63, and a monitoring result determining section 64.

The received byte count measuring section 60 extracts, from header information of the packet, information about the packet length, that is, the "Total Length" field in the case of IPv4 and the "Payload Length" field in the case of IPv6, and cumulatively adds up packet lengths to measure a total data amount (byte count) of the packets received within a measurement interval, described later.

The measurement control section 61 has a built-in timer, as described later, and controls the received byte count measuring section 60 and the allowable rate computing section 62 by means of the timer.

Under the control of the measurement control section 61, the allowable rate computing section 62 looks up the data amount measured by the received byte count measuring section 60, a parameter (average transmission rate) stored in the parameter table 63 and the previous allowable rate to calculate an allowable rate for the next measurement interval, and notifies the monitoring result determining section 64 of the calculated allowable rate.

The parameter table 63 stores parameters such as average transmission rate and the like that are necessary for computing the allowable rate.

The monitoring result determining section 64 looks up the allowable rate supplied from the allowable rate computing section 62 and the packet size of the received packet, supplied from the packet length determining section 51, to determine whether or not the received packet is acceptable, and supplies the result of determination to the acceptability determining section 56.

Figure 5:
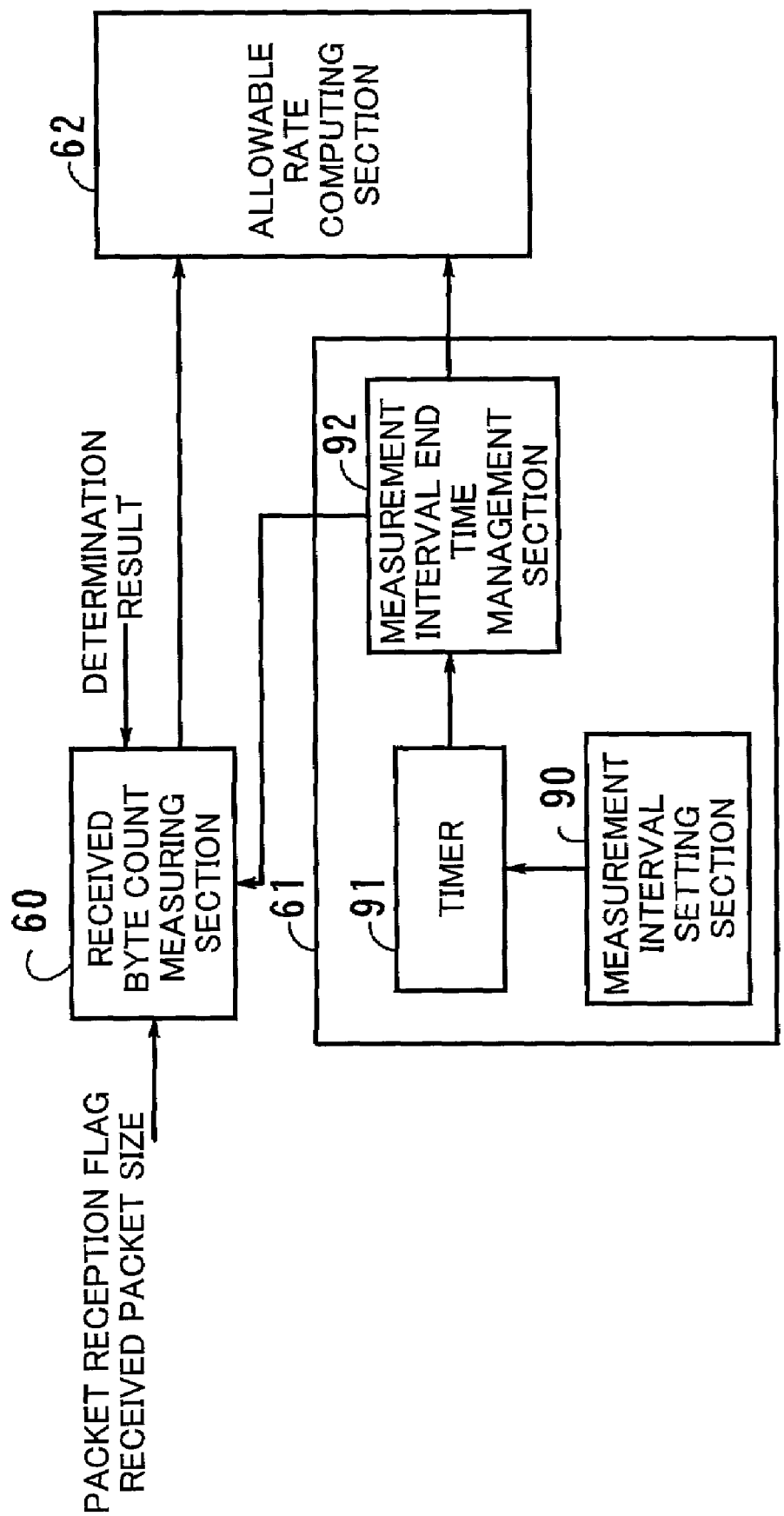
FIG. 5 is a block diagram showing in detail an exemplary configuration of a measurement control section appearing in FIG. 4.

FIG. 5 shows in detail an exemplary configuration of the measurement control section 61 appearing in FIG. 4. As shown in the figure, the measurement control section 61 comprises a timer 91, a measurement interval setting section 90, and a measurement interval end time management section 92.

The measurement interval setting section 90 sets, with respect to the timer 91, a unit measurement interval which is a fundamental unit of measurement, and a measurement interval constituted by a plurality of unit measurement intervals.

With the measurement interval and the unit measurement interval thus set by the measurement interval setting section 90, the timer 91 measures time, and when a time corresponding to the measurement interval has expired, the timer sends a measurement end notification indicative of the end of the measurement interval to the measurement interval end time management section 92.

On receiving the measurement end notification from the timer 91, the measurement interval end time management section 92 instructs the received byte count measuring section 60 to start the measurement of the received byte count for the new measurement interval and also instructs the allowable rate computing section 62 to calculate the allowable rate.

Operation of the above embodiment will be now described.

Let it be assumed, for example, that the transmission rate monitoring apparatus 50 monitors, as packets to be monitored, those packets which are exchanged between the computer 72 on the network 71 and the computer 77 on the network 76.

The packet length determining section 51 of the transmission rate monitoring apparatus 50 selectively receives the packets exchanged between the computers 72 and 77, among those exchanged between the networks 71 and 76. On receiving a target packet, the packet length determining section sets the packet reception flag, extracts from the header a received packet size indicative of the packet length of the received packet, and acquires the threshold from the packet length threshold storing section 52 to determine whether the received packet is a short packet or a long packet. The packet reception flag, the received packet size and the determination result are supplied to the peak transmission rate monitoring section 53 and the average transmission rate monitoring section 55.

Figure 11:
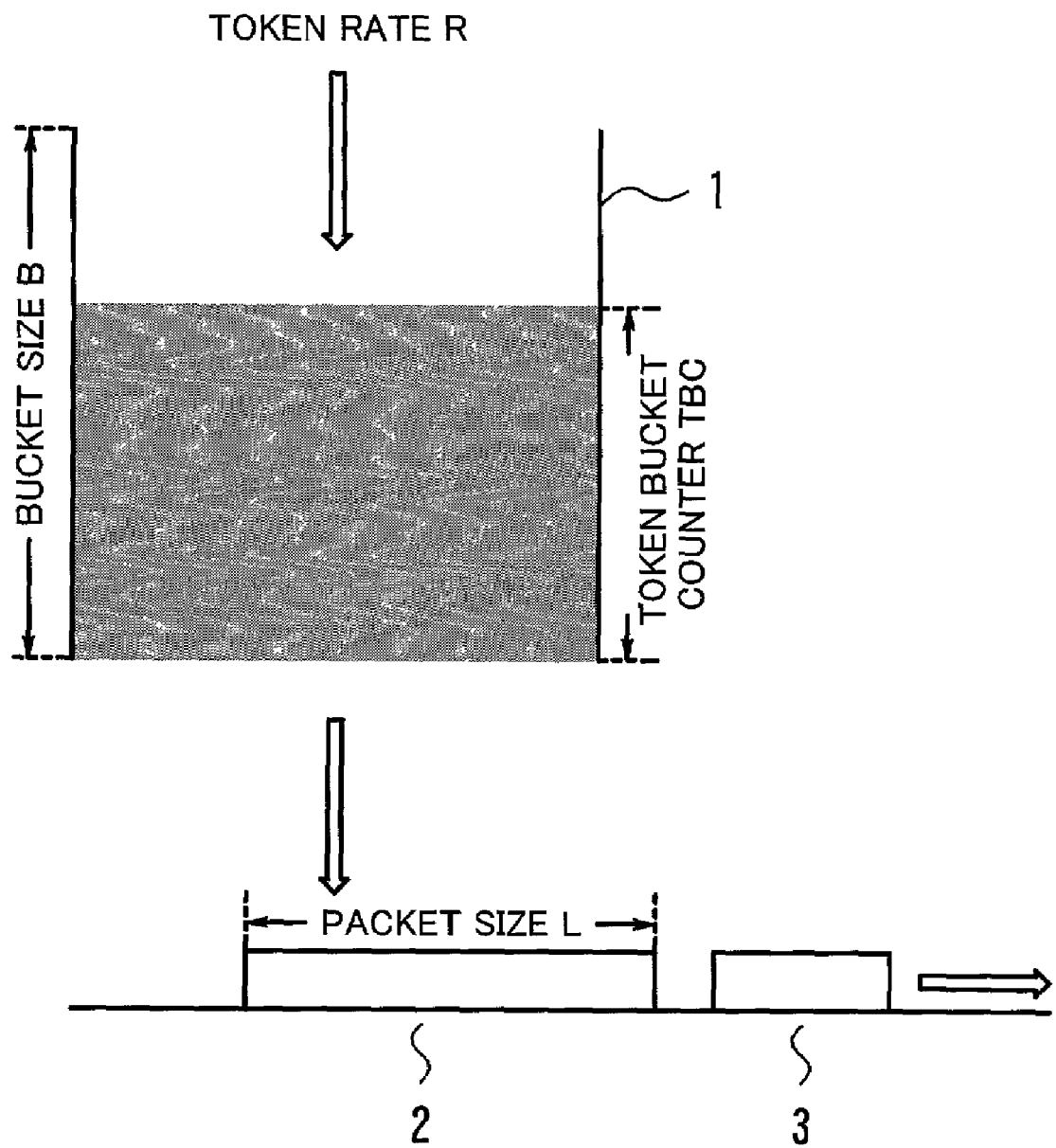
FIG. 11 is a diagram illustrating the principle of operation according to a conventional token bucket procedure.
Figure 12:
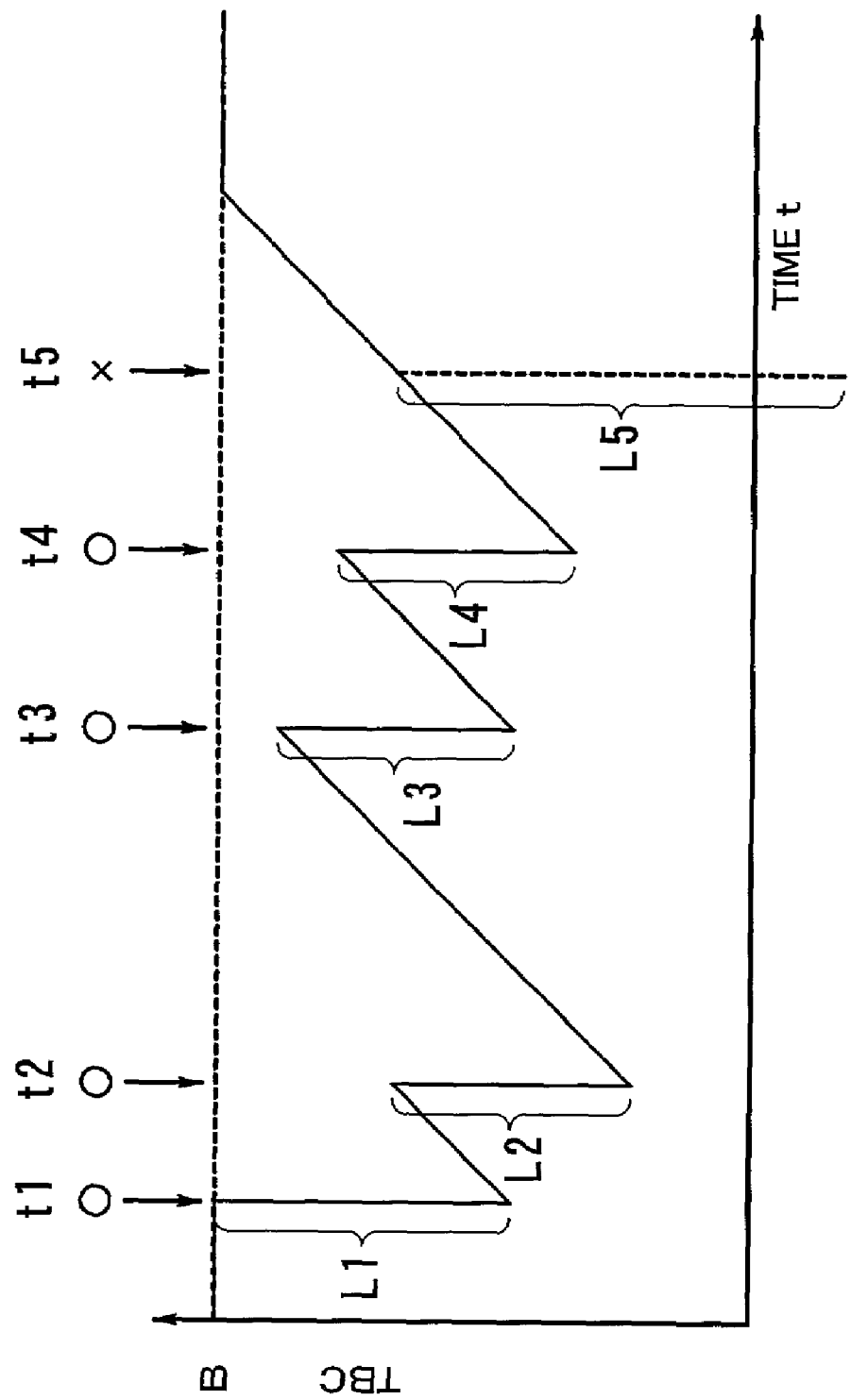
FIG. 12 is a diagram showing time-based change of the value of a token bucket counter used in the token bucket procedure shown in FIG. 11.
Figure 13:
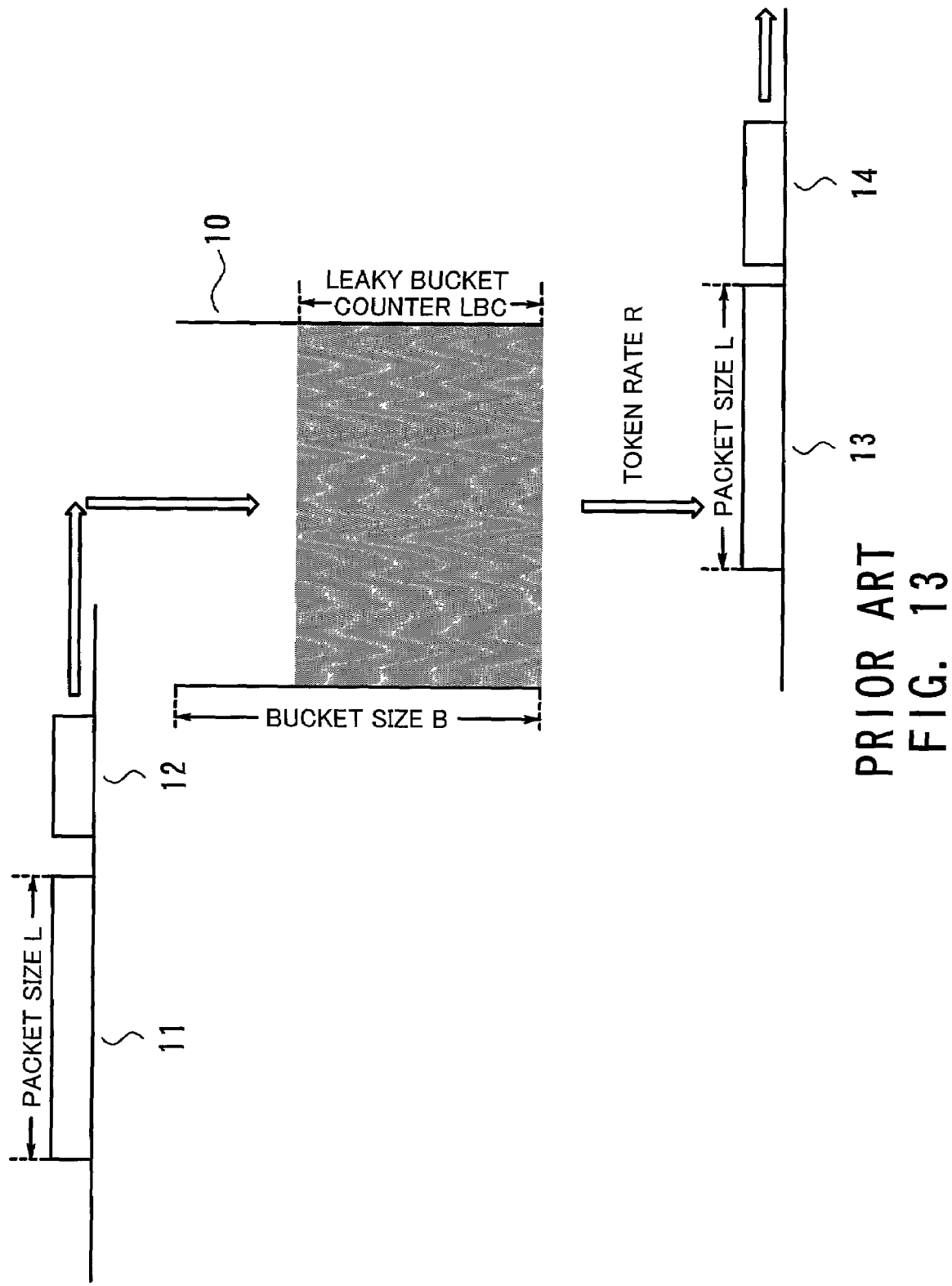
FIG. 13 is a diagram illustrating the principle of operation according to a conventional leaky bucket procedure.
Figure 14:
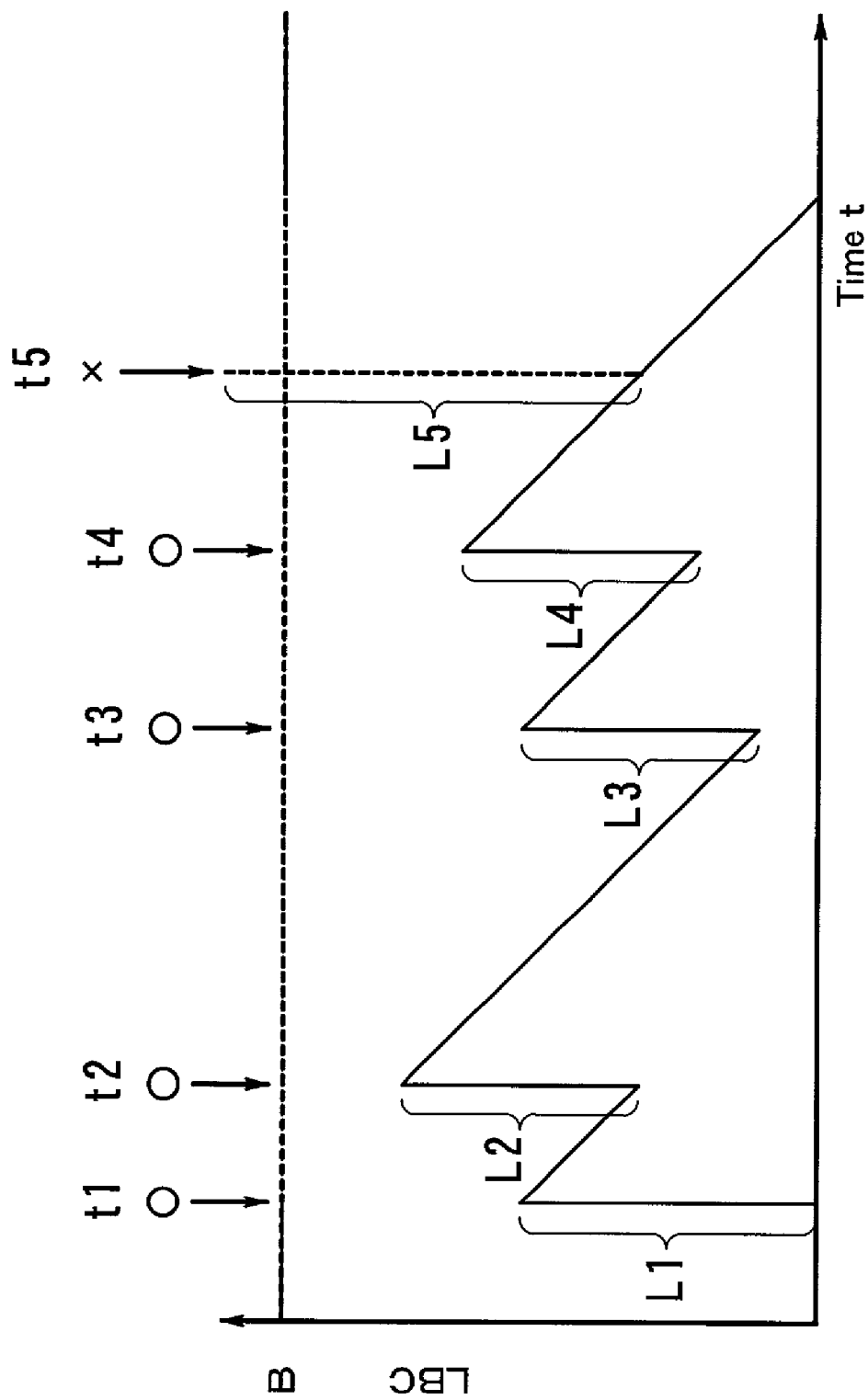
FIG. 14 is a diagram showing time-based change of the value of a leaky bucket counter used in the leaky bucket procedure shown in FIG. 13.

When the packet reception flag has been set, the peak transmission rate monitoring section 53 acquires the packet length determination result and the received packet size supplied thereto from the packet length determining section 51, and subjects only the long packet-related information to a determination process according to the token bucket procedure or the leaky bucket procedure shown in FIG. 11 or 13, to monitor the peak transmission rate. If, as a result, it is judged that because of the input long packet the peak transmission rate will be exceeded, the acceptability determining section 56 is notified of the judgment.

The peak transmission rate monitoring section 53 monitors only long packets for the following reasons: (1) A short packet, even if it causes the peak rate to be exceeded, accounts for only a small proportion of the entire traffic and has little influence over other users, and therefore, inconvenience actually caused is negligible if a short packet is overlooked. (2) The peak transmission rate monitoring section 53 adopts the token bucket procedure or the leaky bucket procedure shown in FIG. 11 or 13, and thus a sufficient processing time cannot be spared for a short packet with a short packet length, causing the possibility of the process failing to be completed within the required time.

The threshold for making a sharp distinction between short and long packets is set appropriately in accordance with the characteristics etc. of the networks 71 and 76. The threshold may be set based on the results of actual measurement of time required for the monitoring process.

The average transmission rate monitoring section 55 acquires information relating to both short and long packets, among the information supplied thereto from the packet length determining section 51, and calculates an average transmission rate by a method described below.

Figure 6:
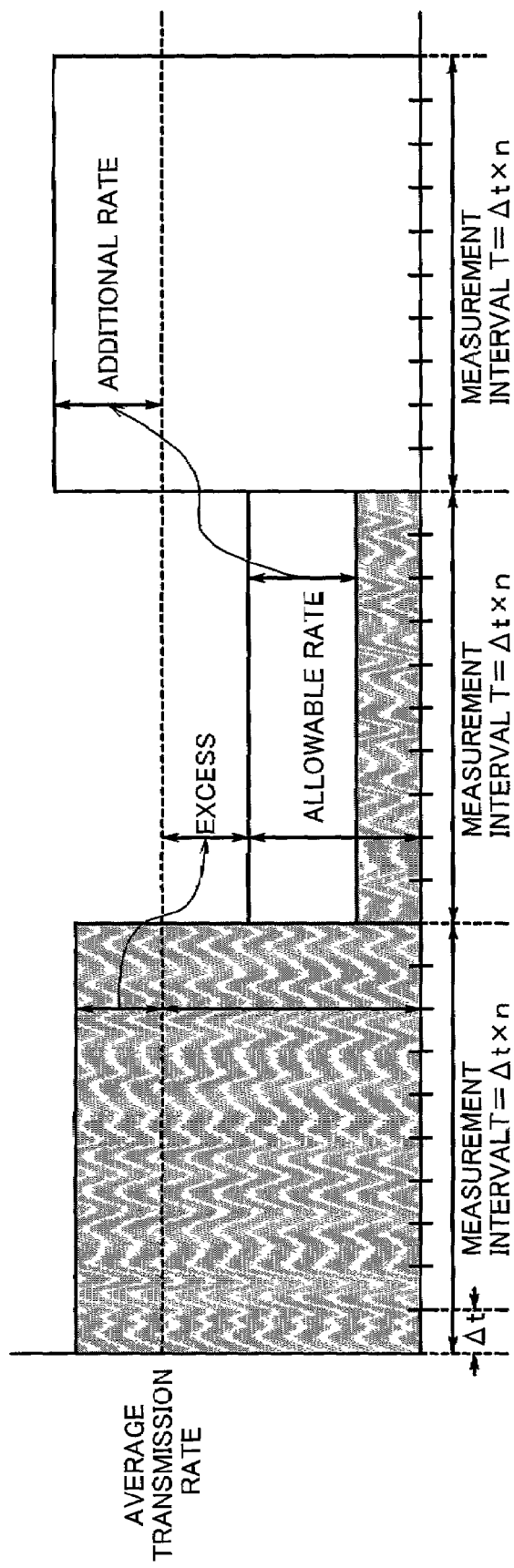
FIG. 6 is a diagram illustrating the principle of operation of the average transmission rate monitoring section appearing in FIG. 3.

First, the method of calculating the average transmission rate will be outlined in brief with reference to FIG. 6.

The average transmission rate monitoring section 55 defines a unit measurement interval with a time length $\Delta t$ and a measurement interval T ($=\Delta t \times n$) constituted by n unit measurement intervals, and monitors packets by using these intervals as monitoring units.

Specifically, the average transmission rate monitoring section 55 first calculates an allowable rate at which packets can be transmitted within the measurement interval T, according to equation (1) below.

$$\text{Allowable rate (next)} = \text{(Allowable rate (now))} - \text{Received data amount} + \text{Average transmission rate} \quad (1)$$

In the equation, "next" in parentheses represents the next measurement interval and "now" represents the present measurement interval. Namely, according to this equation, the allowable rate for the next measurement interval is determined by subtracting a received data amount, which is the total data amount of packets received within the present measurement interval, from the allowable rate for the present measurement interval, and then adding the average transmission rate to the resulting difference.

In the example shown in FIG. 6, in the first measurement interval, the data amount of received packets (dark part) exceeds the average transmission rate, and accordingly, in the second measurement interval, the allowable rate is reduced by an amount corresponding to the excess.

The data amount of packets received within the second measurement interval is smaller than the allowable rate, and therefore, in the third measurement interval, the allowable rate is set at a value larger than the average transmission rate by an additional rate corresponding to the difference.

In this manner, the allowable rate is set with respect to each measurement interval, taking account of the received data amount etc. of the immediately preceding measurement interval.

In the case where the received data amount of packets received in a certain measurement interval exceeds the allowable rate, the average transmission rate monitoring section 55 judges that packets received thereafter are unacceptable, and notifies the acceptability determining section 56 of the judgment. Where the allowable rate is not exceeded, the average transmission rate monitoring section notifies the acceptability determining section that the packet is acceptable. The acceptability determining section 56 discards those packets which have been judged unacceptable, and sends out the other packets onto the network. As a result, the transmission rate of packets is controlled so as not to exceed the average transmission rate.

Operation of the average transmission rate monitoring section 55 will be now described concretely.

Let it be assumed that the monitoring is started with the apparatus set in operation, whereupon the measurement interval setting section 90 determines the unit measurement interval $\Delta t$ and the measurement interval T, shown in FIG. 6, and sets these intervals in the timer 91.

In order to set the allowable rate for the first measurement interval, the timer 91 sends a special measurement end notification to the measurement interval end time management section 92. Consequently, the measurement interval end time management section 92 instructs the allowable rate computing section 62 to compute the allowable rate.

The allowable rate computing section 62 acquires a received data amount from the received byte count measuring section 60. Since, in this example, reception of packets has not yet been started, the received data amount is "0".

Subsequently, the allowable rate computing section 62 calculates an allowable rate for the first measurement interval according to equation (1). In this example, the received data amount is "0" as stated above, and the allowable rate of the immediately preceding measurement interval is also "0"; accordingly, the average transmission rate is set as the allowable rate.

After the computation of the allowable rate is completed, the measurement interval end time management section 92 instructs the received byte count measuring section 60 to start measurement of the byte count of received packets, that is, the received data amount. In this case, the measurement interval end time management section 92 instructs, with respect to each unit measurement interval, the received byte count measuring section 60 to count the data amount of received packets, and accordingly, the received byte count measuring section 60 counts the data amount of packets received in each unit measurement interval. In the case where a packet is discarded by the passage control section 57, the packet should properly not be regarded as a received packet, and thus the received byte count measuring section 60 does not include such a packet in the received data amount.

After the start of reception of packets, each time the packet reception flag is set, the monitoring result determining section 64 acquires the received packet size from the packet length determining section 51, and subtracts the received packet size from the allowable rate which was supplied thereto from the allowable rate computing section 62 at the beginning of the measurement interval.

If a positive value is derived as a result of the subtraction, the allowable rate is not exceeded by the total data amount of received packets, and thus the acceptability determining section 56 is notified that the packet concerned is acceptable. If, on the other hand, a negative value is derived as a result of the subtraction, then the allowable rate is exceeded by the total data amount of received packets. Accordingly, the acceptability determining section 56 is notified that the packet concerned is unacceptable.

When notified of the unacceptability from the monitoring result determining section 64, the acceptability determining section 56 immediately sends a notification of unacceptability to the passage control section 57. As a result, the passage control section 57 discards the packet and all other packets received thereafter in the measurement interval concerned.

When the acceptability determining section is notified from the peak transmission rate monitoring section 53 that the peak transmission rate is exceeded, though the notification from the monitoring result determining section 64 indicates that a packet is acceptable, the acceptability determining section notifies the passage control section 57 that the packet concerned is unacceptable. Consequently, the passage control section 57 discards the packet.

When the acceptability determining section is notified from the monitoring result determining section 64 that a packet is acceptable and also notified from the peak transmission rate monitoring section 53 that the peak transmission rate is not exceeded, the acceptability determining section notifies the passage control section 57 that the packet concerned is acceptable. As a result, the passage control section 57 sends out the packet onto the network.

When the first measurement interval ends, the timer 91 sends a measurement interval end notification to the measurement interval end time management section 92. On receiving the measurement interval end notification, the measurement interval end time management section 92 first instructs the allowable rate computing section 62 to calculate the allowable rate. Consequently, the allowable rate computing section 62 acquires the total data amount of packets received within the measurement interval from the received byte count measuring section 60, subtracts the total data amount from the allowable rate of the measurement interval, and adds the average transmission rate acquired from the parameter table 63 to the resulting difference, thereby calculating the allowable rate for the next measurement interval. The allowable rate calculated in this manner is supplied to and stored in the monitoring result determining section 64.

The monitoring result determining section 64 repeatedly performs the same operation as described above, to monitor the average transmission rate so that the average transmission rate may be kept constant.

According to the process described above, the measurement interval is set and an allowable rate at which packets can be transmitted within the measurement interval is determined. When a packet is received, its packet size is subtracted from the allowable rate. If the resulting value is positive, the packet is judged acceptable, and if the resulting value is negative, the packet is judged unacceptable. It is therefore unnecessary to perform multiplication, unlike the conventional token bucket procedure or leaky bucket procedure, whereby even short packets can be subjected without fail to the calculation for monitoring.

In the above embodiment, the allowable rate is calculated according to equation (1). The allowable rate can also be calculated by adding the average rate to the count value (value derived by subtracting the data amount of received packets from the allowable rate) of a counter, not shown, provided in the monitoring result determining section 64. Specifically, the monitoring result determining section 64 determines the acceptability by successively subtracting the data amount of a received packet from the allowable rate stored in the counter, and thus the value stored in the counter corresponds to the result of the subtraction indicated by the parentheses in equation (1). Accordingly, the value obtained by adding the average transmission rate to the value of the counter corresponds to the allowable rate for the next measurement interval.

By thus calculating the allowable rate by adding the average transmission rate to the value of the counter provided in the monitoring result determining section 64, it is possible to simplify the circuitry and also to shorten the time required for the calculation.

Further, in the above embodiment, the allowable rate for the next measurement interval is calculated in accordance with the result of measurement of the immediately preceding measurement interval. Alternatively, as shown in FIG. 7, the allowable rate for a certain unit measurement interval may be determined in accordance with the measurement result of a measurement interval constituted by a plurality of immediately preceding unit measurement intervals.

Figure 7:
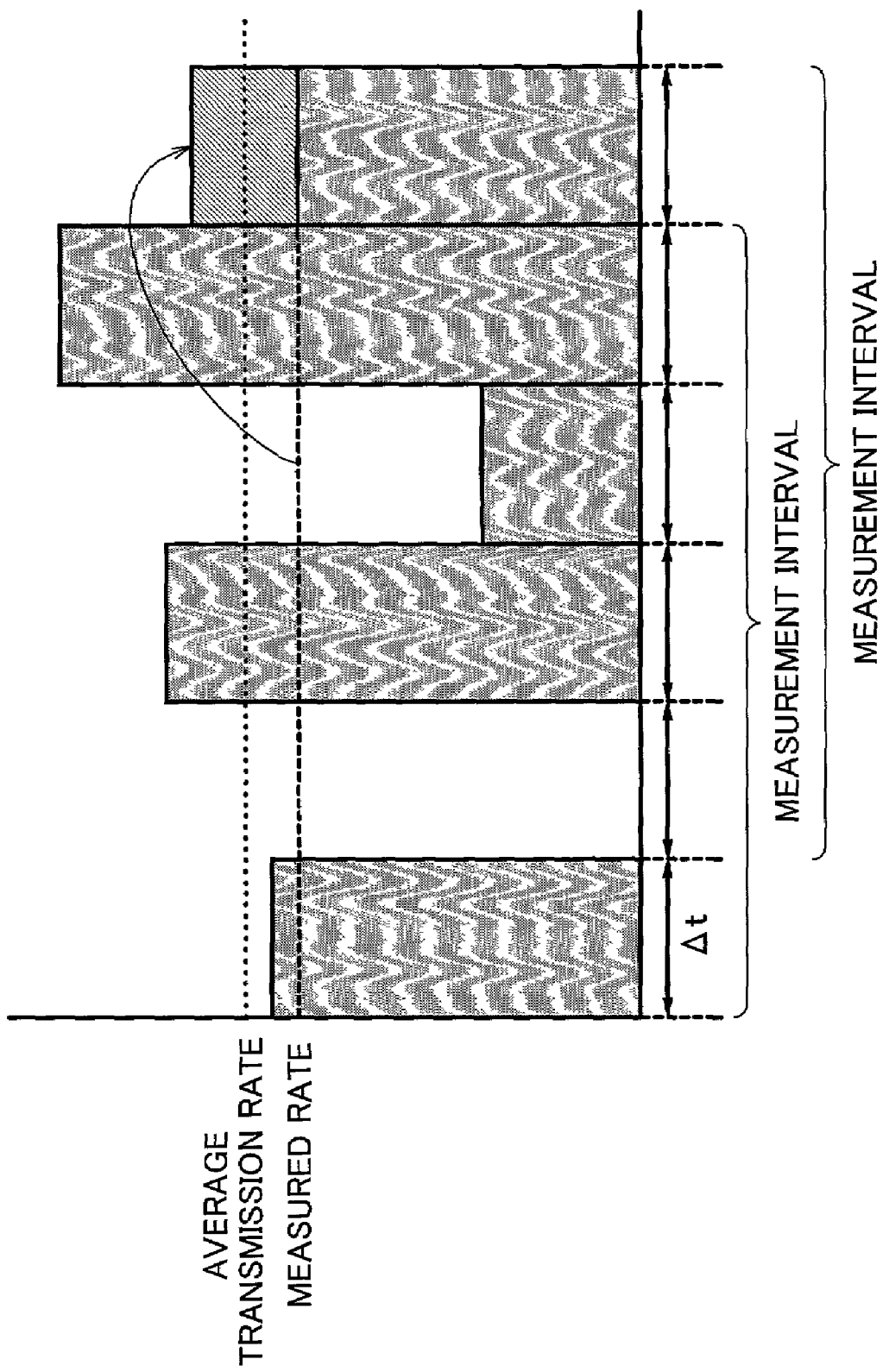
FIG. 7 is a diagram illustrating the principle of operation in the case where an allowable rate for a certain unit measurement interval is determined by the results of measurement over a measurement interval constituted by a plurality of immediately preceding unit measurement intervals.

In the example shown in FIG. 7, the allowable rate for the sixth unit measurement interval is calculated in accordance with the results of measurement of the immediately preceding five unit measurement intervals. When calculating the allowable rate for the next unit measurement interval (seventh unit measurement interval), the set of the five unit measurement intervals is shifted by one unit measurement interval, and the allowable rate for the seventh unit measurement interval is calculated in accordance with the results of measurement of the second through sixth unit measurement intervals.

Where the allowable rate is set for each unit measurement interval in this manner, the packet control can be performed more finely.

Moreover, although the foregoing embodiment is described on the assumption that the measurement interval is fixed all the time, the measurement interval may be varied depending on whether the average rate is high or low. In such an embodiment, the measurement interval may be shortened when the average rate is high and may be lengthened when the average rate is low, for example, whereby variations in quantities calculated for the individual measurement intervals can be lessened.

Further, in the above embodiment, after a determination is made as to whether or not the received packet is a short packet, the acceptability of the packet is determined by comparison using the allowable rate. Alternatively, when the value derived by subtracting the data amount of a received packet from the allowable rate is greater than the threshold, the packet may unconditionally be judged acceptable. With such construction, calculations related to the determination process can be reduced.

Figure 8:
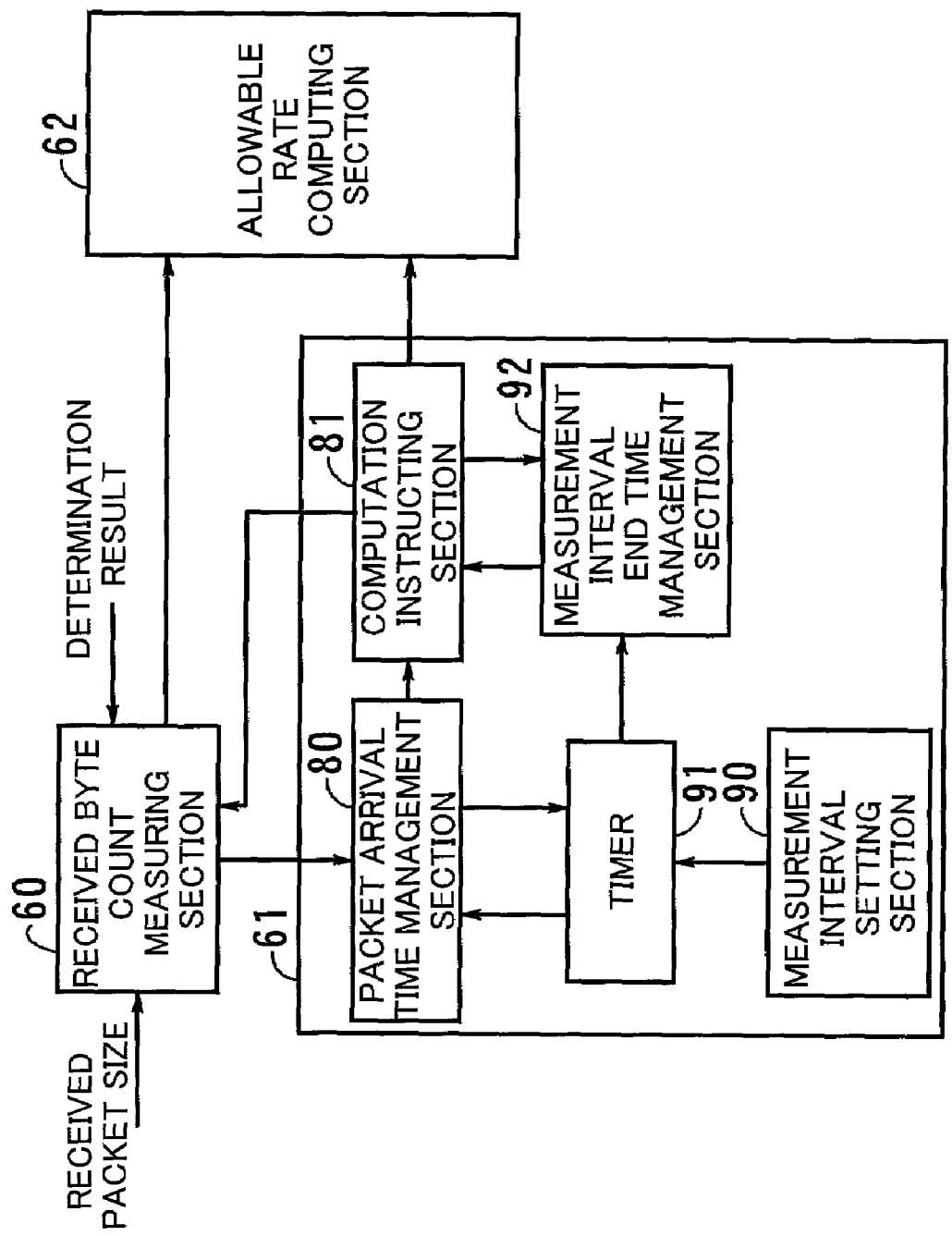
FIG. 8 is a block diagram showing in detail another exemplary configuration of the measurement control section appearing in FIG. 4.

Referring now to FIG. 8, another exemplary configuration of the measurement control section 61 will be described. In the embodiment shown in FIG. 5, the measurement control section 61 is designed to calculate the allowable rate each time the measurement interval ends, but in cases where a packet is not received for a long time, it is useless to repeatedly execute such a calculation process. Therefore, in the embodiment shown in FIG. 8, if the measurement interval has already ended at the time when a packet is received, the allowable rate for the next measurement interval is calculated, and if the measurement interval has not ended yet, the calculation is postponed until the next packet arrives, thus making it possible to reduce useless calculations.

In this embodiment, a packet arrival time management section 80 and a computation instructing section 81 are additionally provided, as compared with the configuration shown in FIG. 5. In other respects, the configuration is identical with that shown in FIG. 5. Thus, identical reference numerals are used to denote elements corresponding to those appearing in FIG. 5, and detailed description of such elements is omitted.

When notified of the reception of a packet from the received byte count measuring section 60, the packet arrival time management section 80 stores the time at which the packet arrived.

When a packet has arrived and also if the measurement interval end notification has been received from the measurement interval end time management section 92, that is, if the measurement interval has already expired, the computation instructing section 81 calculates a difference between the end time of the measurement interval and the packet arrival time to obtain a time for which the measurement interval has been prolonged (hereinafter referred to as prolonged time), and notifies the allowable rate computing section 62 of the prolonged time.

The allowable rate computing section 62 first notifies the monitoring result determining section 64 of the prolongation of the measurement interval and the prolonged time.

Based on the prolonged time, the monitoring result determining section 64 calibrates the allowable rate stored in the counter. If the result of subtraction of the data amount of the received packet from the calibrated allowable rate (count value) shows a positive value, the packet concerned is judged acceptable; otherwise the packet is judged unacceptable. The acceptability determining section 56 is notified of the result of judgment.

Subsequently, the allowable rate computing section 62 calibrates the allowable rate of the present measurement interval based on the prolonged time, and then calculates the allowable rate for the next measurement interval according to equation (1). The allowable rate for the next measurement interval calculated in this manner is supplied to the monitoring result determining section 64 and used for the monitoring of the average transmission rate in the next measurement interval.

After the computation of the allowable rate is completed, the computation instructing section 81 notifies the measurement interval end time management section 92 of the start of a new measurement interval.

According to the process described above, if the measurement interval has already expired at the time when a packet arrives, the allowable rate for the next measurement interval is calculated. In cases where a packet is not received for a long time, for example, the allowable rate calculation process can be omitted, making it possible to mitigate the load on the overall apparatus.

Referring lastly to the flowcharts of FIGS. 9 and 10, the process executed in this embodiment will be described.

Figure 9:
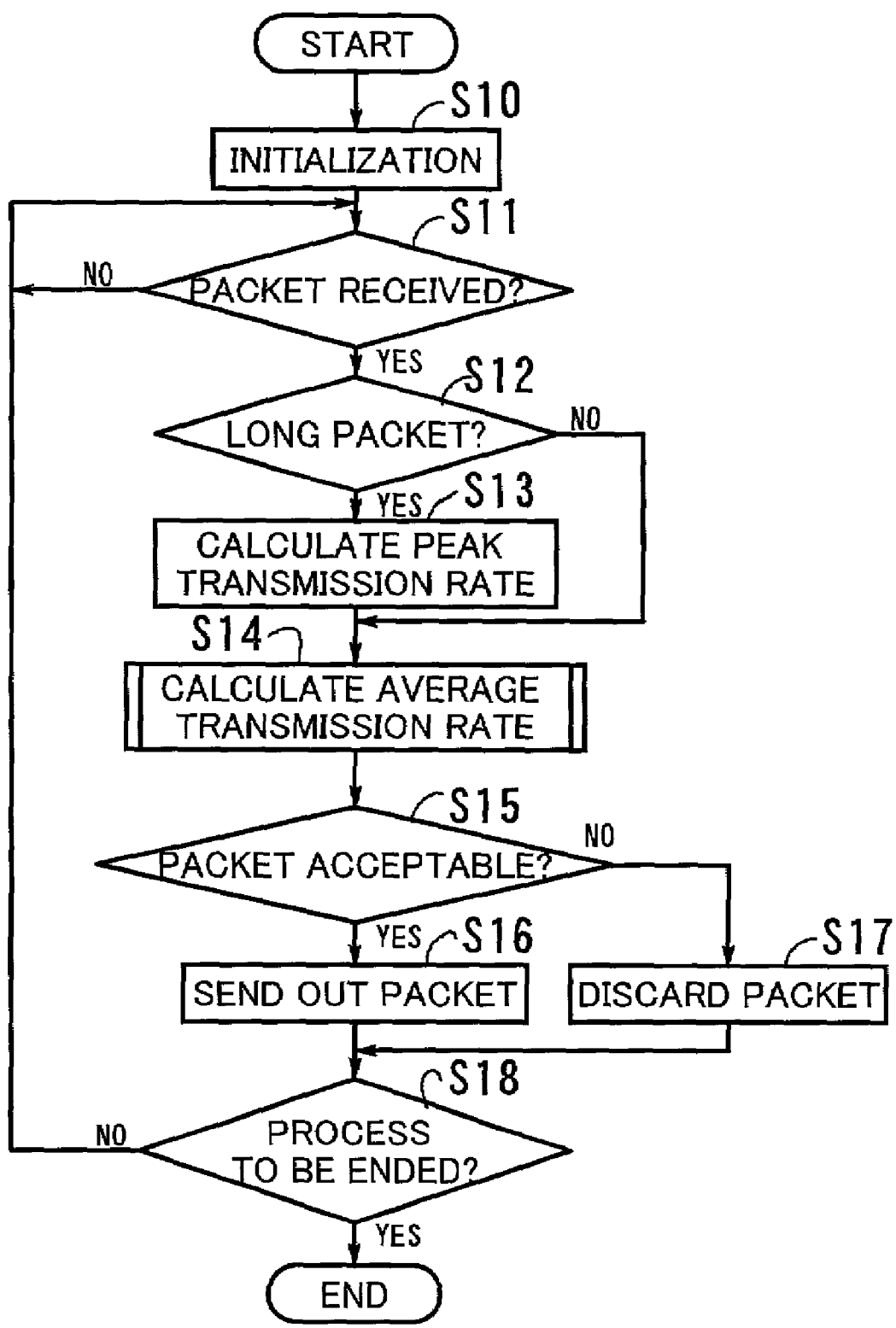
FIG. 9 is a flowchart illustrating an example of a process executed in the embodiment shown in FIG. 3.

FIG. 9 illustrates an example of the process executed in the embodiment shown in FIG. 3. Upon start of the process shown in the flowchart, the following steps are executed.

Step S10:

The peak transmission rate monitoring section 53 and the average transmission rate monitoring section 55 perform initialization prior to the start of reception of packets.

Step S11:

The packet length determining section 51 determines whether or not a target packet to be monitored has been received. If such a packet has been received, the flow proceeds to Step S12; if not, this step is repeatedly executed.

Step S12:

The packet length determining section 51 compares the packet length of the received packet with the threshold stored in the packet length threshold storing section 52, to determine whether or not the packet is a long packet. If, as a result, the packet is found to be a long packet, the flow proceeds to Step S13; if not, the flow proceeds to Step S14.

Step S13:

The peak transmission rate monitoring section 53 calculates the peak transmission rate according to the token bucket procedure or the leaky bucket procedure, for example.

Step S14:

The average transmission rate monitoring section 55 calculates the average transmission rate according to a process described later with reference to FIG. 10.

Step S15:

The acceptability determining section 56 looks up the results of monitoring by the peak transmission rate monitoring section 53 and the average transmission rate monitoring section 55, to determine whether or not the packet is acceptable. If the packet is acceptable, the flow proceeds to Step S16; if not, the flow proceeds to Step S17.

Step S16:

The passage control section 57 sends out the packet onto the network.

Step S17:

The passage control section 57 discards the packet.

Step S18:

It is determined whether or not the process is to be ended. If the process should not be ended, the flow returns to Step S11 and the same process is repeated; otherwise the process is ended.

Figure 10:
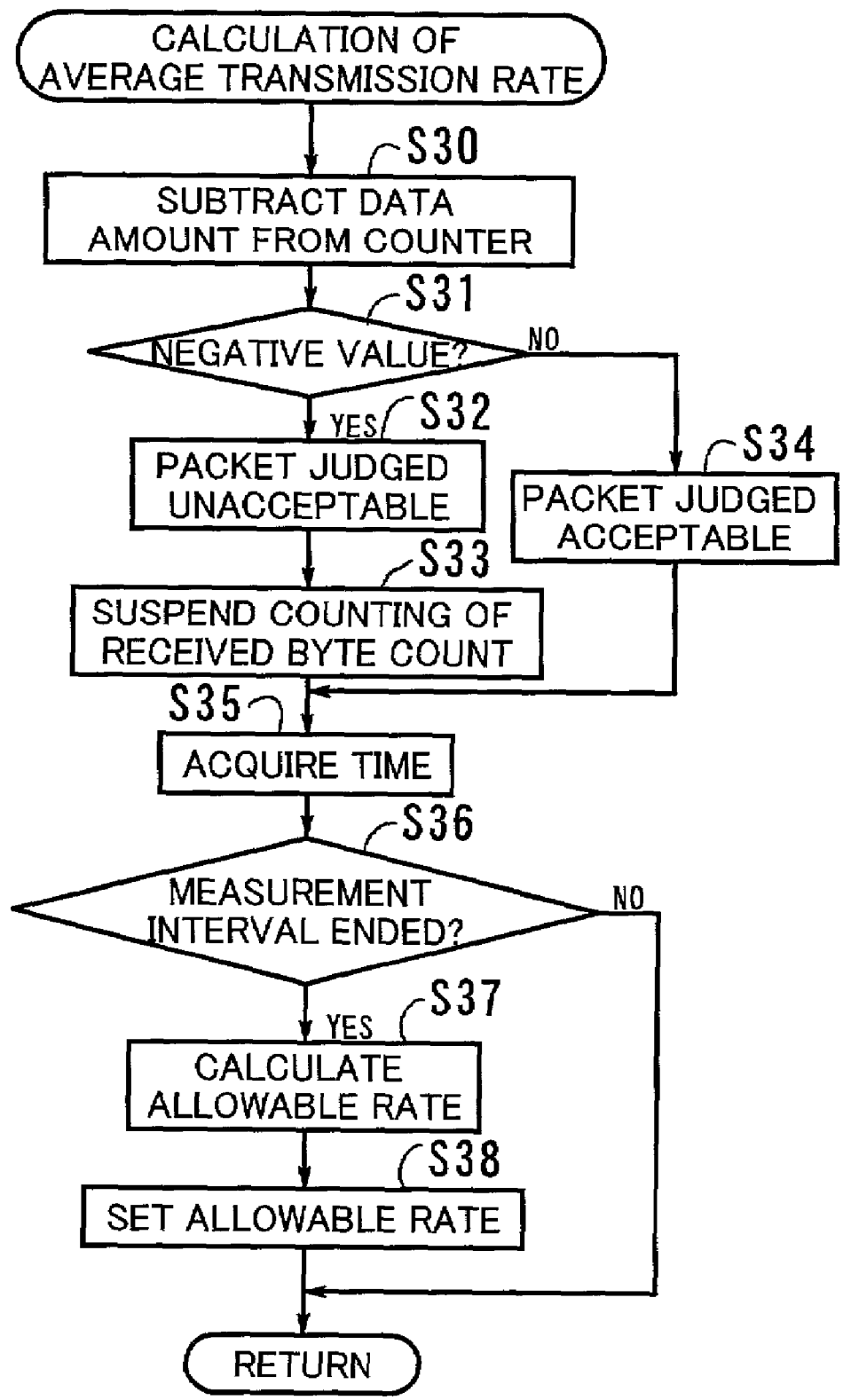
FIG. 10 is a flowchart illustrating details of an average transmission rate calculation process appearing in FIG. 9.

Referring now to FIG. 10, the average transmission rate calculation process in Step S14 will be described in detail. Upon start of the process shown in the flowchart of FIG. 10, the following steps are executed.

Step S30:

The monitoring result determining section 64 subtracts the data amount of the packet from the value (allowable rate) stored in the built-in counter.

Step S31:

If the result of the subtraction in Step S30 shows a negative value, the monitoring result determining section 64 executes Step S32; otherwise the flow proceeds to Step S34.

Step S32:

The monitoring result determining section 64 judges that the received packet is unacceptable.

Step S33:

The monitoring result determining section 64 causes the received byte count measuring section 60 to suspend counting of the packet data amount.

Step S34:

The monitoring result determining section 64 judges that the received packet is acceptable.

Step S35:

The measurement interval end time management section 92 acquires a current time from the timer 91.

Step S36:

The measurement interval end time management section 92 looks up the measurement interval end notification from the timer 91, to determine whether or not the measurement interval has ended. If the measurement interval is judged to have been ended, the flow proceeds to Step S37; if not, the original process is resumed.

Step S37:

The allowable rate computing section 62 calculates the allowable rate for the next measurement interval according to equation (1).

Step S38:

The allowable rate computing section 62 sets the calculated allowable rate in the built-in counter.

The process described above makes it possible to perform the functions explained with reference to FIG. 3.

As described above, according to the present invention, a transmission rate monitoring apparatus for monitoring a transmission rate of a transmission channel comprises data receiving means for receiving data, average transmission rate setting means for setting a desired average transmission rate with respect to a predetermined time period, data amount measuring means for measuring an amount of data received by the data receiving means, and data accepting/discarding means for accepting or discarding the data received by the data receiving means, in accordance with the data amount measured within the predetermined time period by the data amount measuring means and the average transmission rate, whereby the transmission rate can be observed in a short time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission rate monitoring apparatus for monitoring a transmission rate of a transmission channel, comprising:

a received byte count measuring section for measuring an amount of data of a packet received within a present measurement interval;

an allowable rate computing section for calculating an allowable rate for a next measurement interval, looking up the data amount and average transmission rate stored in a parameter table;

an acceptability determining section for judging that the received packet is unacceptable when the received packet exceeds the allowable rate, and judging that the received packet is acceptable when the received packet does not exceed the allowable rate; and passage control section for carrying out in accordance with the decision made by said acceptability determining section such that the received packet is allowed to pass or is discarded.

2. The apparatus according to claim 1, wherein said allowable rate computing section calculates the allowable rate which packets can be transmitted with in the next measurement interval:

the allowable rate being given by:

Allowable rate (next)=(Allowable rate (now)−received data amount)+Average transmission rate "next" in parentheses representing the next measurement interval and "now" representing the present measurement interval, and wherein according to the equation, the allowable rate for the next measurement interval is determined by subtracting a received data amount, which is the total data amount of packers received within the present measurement interval, from the allowable rate for the present measurement interval, and then adding the average transmission rate to the resulting difference.

3. The apparatus according to claim 1, wherein the next measurement interval is constituted by a plurality of unit time periods, and further comprising time period determining means for setting the next measurement interval in accordance with a magnitude of the average transmission rate.

4. The apparatus according to claim 1, wherein, when the packet is discarded during a predetermined measurement interval, said passage control section unconditionally discards a further packet received thereafter within the predetermined measurement interval.

5. The apparatus according to claim 1, further comprising:

classifying means for classifying the received packet by comparing a packet length of the received packet with a predetermined threshold, and peak rate monitoring means for monitoring, in terms of a peak rate, a packet with the packet length greater than the predetermined threshold, among the packet classified by said classifying means, wherein said passage control section also looks up a result of the monitoring by said peak rate monitoring means to determine whether to accept or discard the packet.

6. The apparatus according to claim 5, further comprising threshold setting means for setting the threshold used by said classifying means, in accordance with a rate of the received packet.

7. The apparatus according to claim 5, wherein said passage control section does not discard the packet if a value obtained by subtracting a packet amount from an average transmission rate is greater than the threshold.

8. The apparatus according to claim 5, further comprising threshold setting means for setting the threshold used by said classifying means, in accordance with a time spent on a calculating process.

9. A transmission rate monitoring method for monitoring a transmission rate of a transmission channel, comprising:
- a received byte count measuring step of measuring an amount of data of a packet received within a present measurement interval;
- an allowable rate computing step of calculating an allowable rate for a next measurement interval, looking up the data amount and average transmission rate stored in a parameter table;
- an acceptability determining step of judging that the received packet is unacceptable when the received packet exceeds the allowable rate, and judging that the received packet is acceptable when the received packet doesn't exceed the allowable rate; and
- passage control step of carrying out in accordance with the decision made by said acceptability determining section such that the received packet is allowed to pass or is discarded.

* * * * *